(12) United States Patent
Ciccarelli

(10) Patent No.: US 11,235,794 B1
(45) Date of Patent: Feb. 1, 2022

(54) BEACH CART

(71) Applicant: Diego Ciccarelli, Worcester, MA (US)

(72) Inventor: Diego Ciccarelli, Worcester, MA (US)

( * ) Notice: Subject to any disclaimer, the term of this patent is extended or adjusted under 35 U.S.C. 154(b) by 38 days.

(21) Appl. No.: 16/853,823

(22) Filed: Apr. 21, 2020

(51) Int. Cl.
*B62B 3/10* (2006.01)
*B62B 3/02* (2006.01)
*B62B 5/00* (2006.01)
*B62B 3/00* (2006.01)
*B62B 5/06* (2006.01)

(52) U.S. Cl.
CPC ............... *B62B 3/10* (2013.01); *B62B 3/002* (2013.01); *B62B 3/02* (2013.01); *B62B 5/00* (2013.01); *B62B 5/0013* (2013.01); *B62B 5/06* (2013.01); *B62B 2202/52* (2013.01)

(58) Field of Classification Search
CPC .. B62B 3/10; B62B 3/02; B62B 3/002; B62B 5/00; B62B 5/06; B62B 5/0013; B62B 2202/52
See application file for complete search history.

(56) References Cited

U.S. PATENT DOCUMENTS

| 3,866,934 | A | * | 2/1975 | Braun | A63B 55/60 |
| | | | | | 280/655 |
| 4,550,930 | A | * | 11/1985 | Proffit | A63B 55/60 |
| | | | | | 280/655 |
| 4,865,346 | A | * | 9/1989 | Carlile | B62B 1/12 |
| | | | | | 280/654 |
| 4,887,786 | A | * | 12/1989 | Stokes | A45B 11/00 |
| | | | | | 248/512 |
| 5,269,157 | A | * | 12/1993 | Ciminelli | A45B 11/00 |
| | | | | | 280/47.18 |
| 5,480,170 | A | | 1/1996 | Kaiser | |
| 5,636,852 | A | * | 6/1997 | Sistrunk | B62B 1/12 |
| | | | | | 248/156 |
| 5,857,684 | A | * | 1/1999 | Liao | B60L 53/80 |
| | | | | | 280/40 |
| 6,076,298 | A | * | 6/2000 | Teel | A01K 97/22 |
| | | | | | 43/54.1 |
| 6,113,129 | A | * | 9/2000 | Marques | B62B 1/12 |
| | | | | | 248/129 |
| 6,234,187 | B1 | * | 5/2001 | Izzo | A45B 11/00 |
| | | | | | 135/15.1 |

(Continued)

FOREIGN PATENT DOCUMENTS

WO 2008123981 10/2008

*Primary Examiner* — Erez Gurari
(74) *Attorney, Agent, or Firm* — Kyle A. Fletcher, Esq.

(57) ABSTRACT

The beach cart is a hand propelled vehicle. The beach cart is configured for use in transporting a load over a supporting surface. The beach cart comprises a master cart, an umbrella structure, and a handle. The handle and the umbrella structure attach to the master cart. The master cart is a rolling structure. The master cart forms a containment structure that contains the load during transport on the beach cart. The master cart is configured for use with an umbrella. The umbrella structure attaches an umbrella to the master cart. The umbrella structure allows the umbrella to be used while attached to the master cart. The handle manipulates and propels the beach cart. The master cart is configured for use with a cooler. The cooler removably inserts into the master cart to form a portion of the load carried by the master cart.

19 Claims, 4 Drawing Sheets

(56) References Cited

U.S. PATENT DOCUMENTS

| | | | |
|---|---|---|---|
| 6,626,453 B1* | 9/2003 | Theus | B62B 1/10 |
| | | | 280/47.26 |
| 6,736,416 B1* | 5/2004 | Romeo | B62B 1/208 |
| | | | 280/47.18 |
| 7,143,601 B1* | 12/2006 | Jimenez | F25D 23/12 |
| | | | 62/457.7 |
| 7,210,545 B1* | 5/2007 | Waid | B60K 7/0007 |
| | | | 180/19.1 |
| 8,069,939 B1 | 12/2011 | Metzler | |
| D652,263 S * | 1/2012 | Whitman | D7/605 |
| 8,181,811 B1* | 5/2012 | Blake | A45F 3/44 |
| | | | 220/475 |
| 9,061,695 B1 | 6/2015 | Mann | |
| 9,101,206 B1* | 8/2015 | Chen | B62B 5/0013 |
| 9,440,668 B1* | 9/2016 | Chen | B62B 3/02 |
| 9,855,962 B1* | 1/2018 | Chen | B62B 5/067 |
| 10,080,937 B1* | 9/2018 | Nichol | A45B 11/00 |
| 2001/0013358 A1* | 8/2001 | Patarra | A45B 3/00 |
| | | | 135/16 |
| 2008/0224017 A1* | 9/2008 | Woller | A45B 11/00 |
| | | | 248/539 |
| 2008/0238012 A1 | 10/2008 | Carter | |
| 2010/0102524 A1* | 4/2010 | Larsen | B62B 3/02 |
| | | | 280/35 |
| 2011/0025005 A1 | 2/2011 | Howell | |
| 2014/0077467 A1* | 3/2014 | Galante | B62B 5/085 |
| | | | 280/35 |
| 2017/0043800 A1* | 2/2017 | Chaloux | B62B 1/12 |
| 2018/0237046 A1 | 8/2018 | Bovino | |
| 2021/0171084 A1* | 6/2021 | Bankhead | B62B 15/007 |

\* cited by examiner

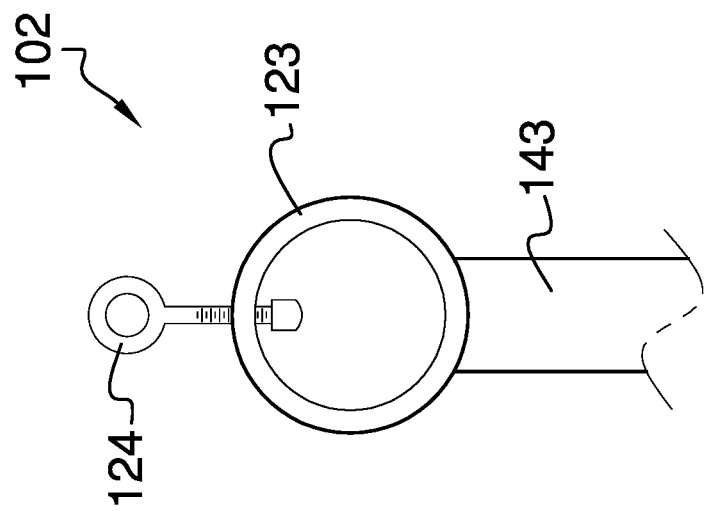
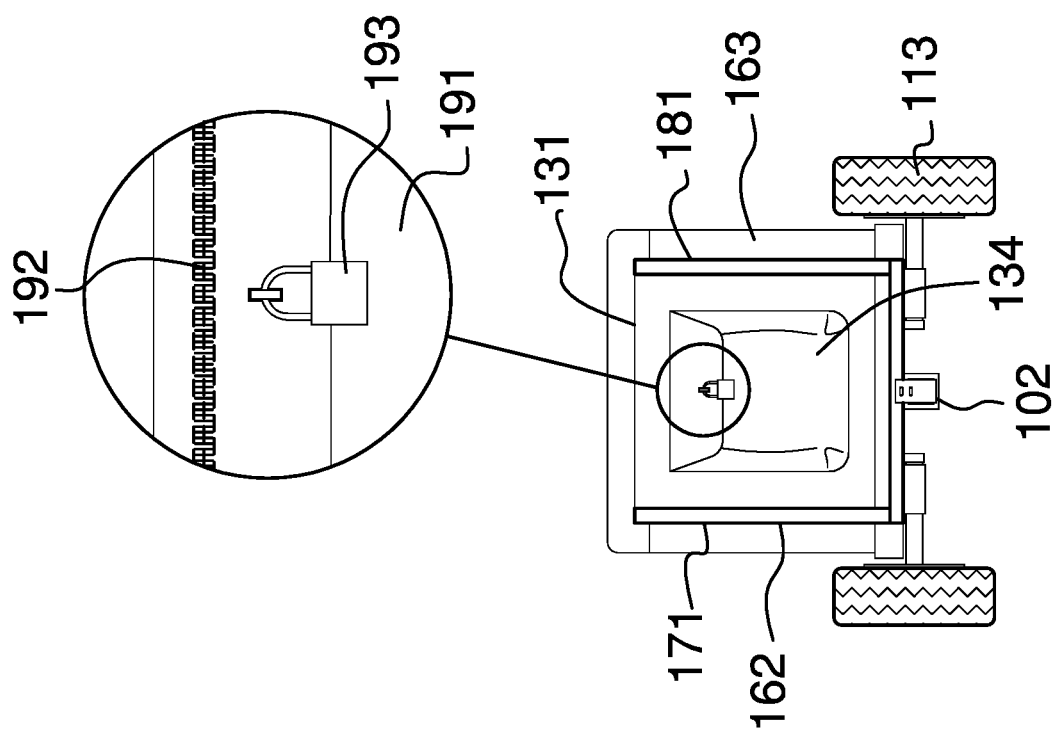

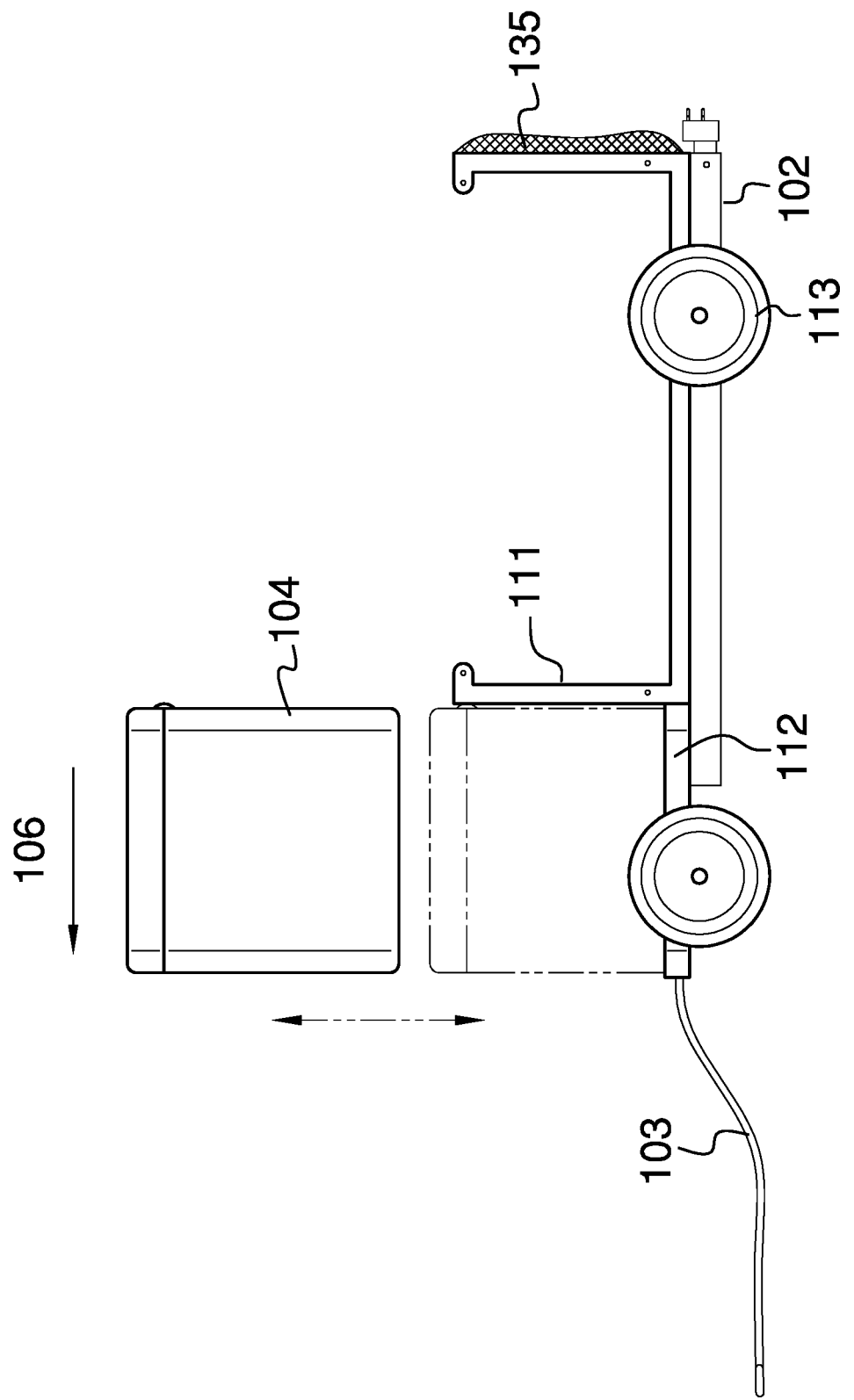

BEACH CART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including hand propelled vehicles, more specifically, a hand cart with more than one axis with wheels. (B62B3/02).

SUMMARY OF INVENTION

The beach cart is a hand propelled vehicle. The beach cart is configured for use in transporting a load over a supporting surface. The beach cart comprises a master cart, an umbrella structure, and a handle. The handle and the umbrella structure attach to the master cart. The master cart is a rolling structure. The master cart forms a containment structure that contains the load during transport on the beach cart. The master cart is configured for use with an umbrella. The umbrella structure attaches an umbrella to the master cart. The umbrella structure allows the umbrella to be used while attached to the master cart. The handle manipulates and propels the beach cart. The master cart is configured for use with a cooler. The cooler removably inserts into the master cart to form a portion of the load carried by the master cart.

These together with additional objects, features and advantages of the beach cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the beach cart in detail, it is to be understood that the beach cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the beach cart.

It is therefore important that the claims be regarded as including such equivalent construction insofar as they do not depart from the spirit and scope of the beach cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a posterior view of an embodiment of the disclosure.

FIG. 3 is a detail view of an embodiment of the disclosure.

FIG. 4 is a side view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
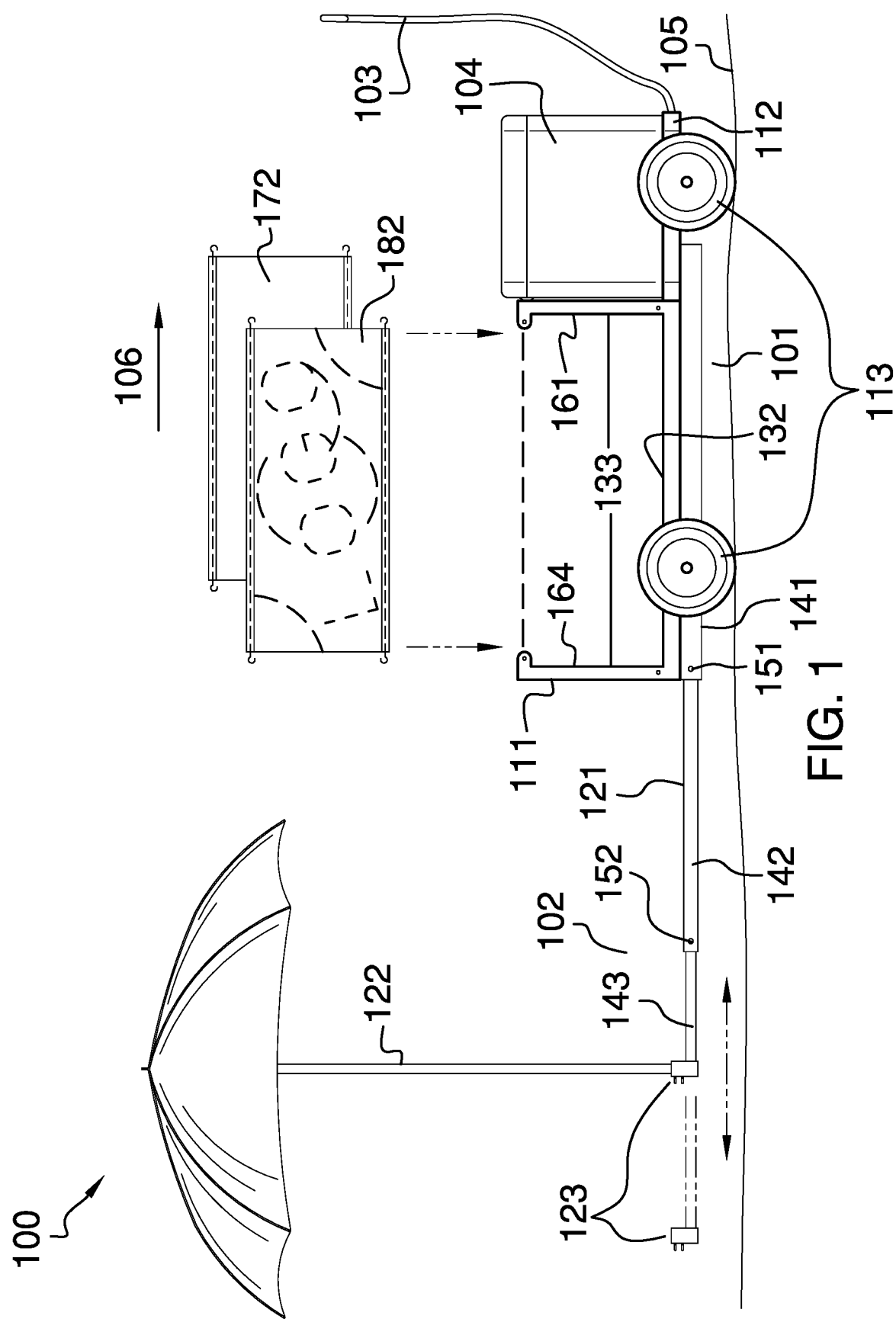
FIG. 1 is an in-use view of an embodiment of the disclosure.
Figure 5:
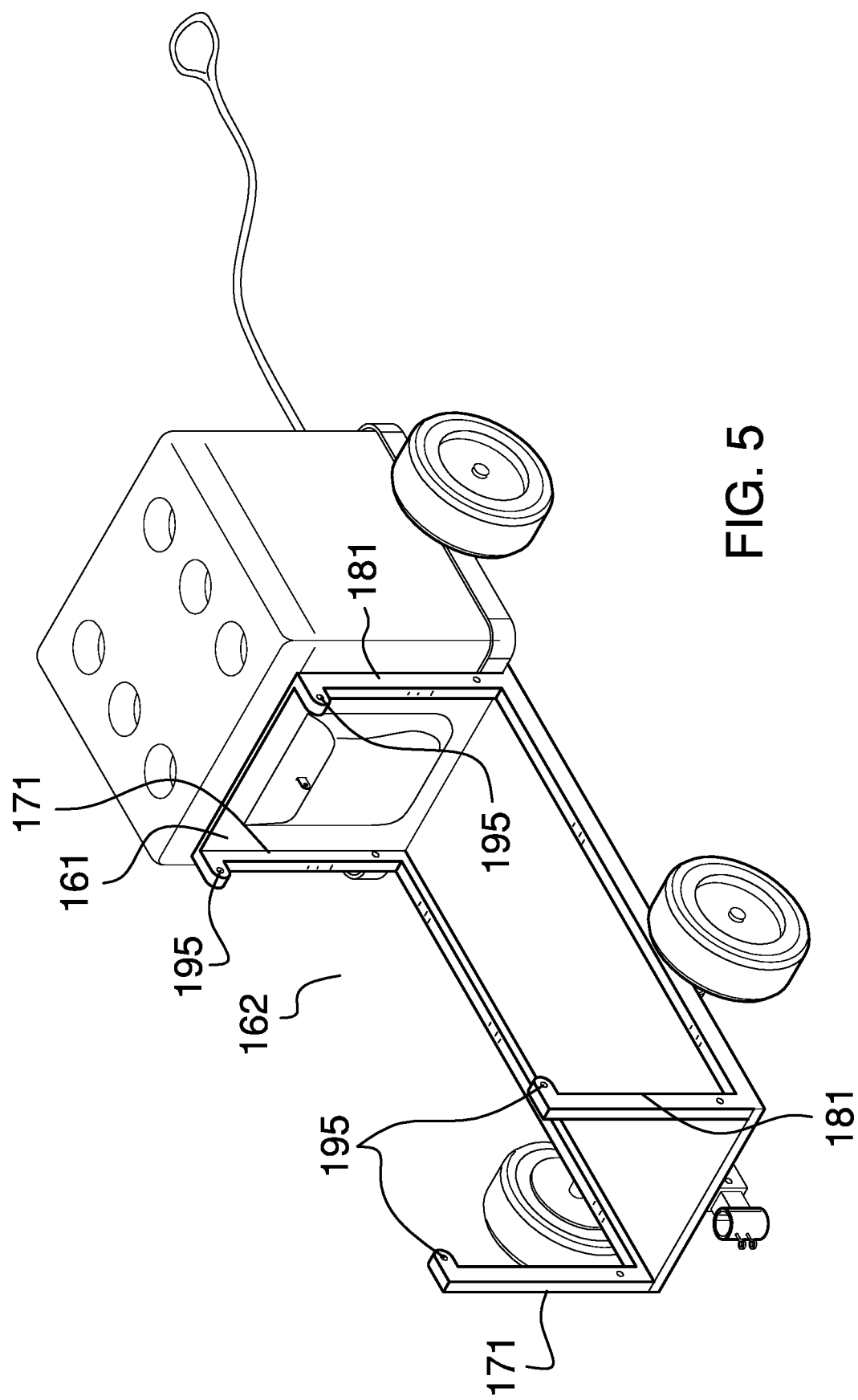
FIG. 5 is a perspective view of an embodiment of the disclosure.

Detailed reference will now be made to one or more potential embodiments of the disclosure, which are illustrated in FIGS. 1 through 5.

The beach cart 100 (hereinafter invention) is a hand propelled vehicle. The invention 100 is configured for use in transporting a load over a supporting surface 105. The invention 100 comprises a master cart 101, an umbrella 122 structure 102, and a handle 103. The handle 103 and the umbrella 122 structure 102 attach to the master cart 101. The master cart 101 is a rolling structure. The master cart 101 forms a containment structure that contains the load during transport on the invention 100. The master cart 101 is configured for use with an umbrella 122. The umbrella 122 structure 102 attaches an umbrella 122 to the master cart 101. The umbrella 122 structure 102 allows the umbrella 122 to be used while attached to the master cart 101. The handle 103 manipulates and propels the invention 100. The master cart 101 is configured for use with a cooler 104. The cooler 104 removably inserts into the master cart 101 to form a portion of the load carried by the master cart 101.

The cooler 104 is an insulating structure. The insulating structure is defined elsewhere in this disclosure. The cooler 104 is a prism-shaped structure. The cooler 104 is a hollow structure. The cooler 104 is an enclosable structure. The cooler 104 maintains a foodstuff at a temperature different from the ambient temperature surrounding the invention 100. The cooler 104 inserts into the master cart 101 such that the cooler 104 will not shift during transportation.

The supporting surface 105 is defined elsewhere in this disclosure.

The master cart 101 forms the primary vehicle structure of the invention 100. The master cart 101 is a hand propelled structure. The master cart 101 is a rolling structure. The master cart 101 rolls over a supporting surface 105. The master cart 101 is a load bearing structure. The umbrella 122 structure 102 attaches to the master cart 101. The handle 103 attached to the master cart 101. The cooler 104 inserts into the master cart 101 for storage. The master cart 101 comprises a pan structure 111, a cooler 104 pan 112, and a plurality of wheels 113. The master cart 101 is further defined with a primary sense of direction 106. The primary sense of direction 106 is defined elsewhere in this disclosure.

The pan structure 111 is a containment structure. The pan structure 111 is a prism-shaped structure. The pan structure 111 has a semi-enclosed prism structure. The pan structure 111 forms a load bearing platform. The pan structure 111 contains a load during transport. The load contained by the pan structure 111 is the load carried by the master cart 101 with the exception of the cooler 104. The pan structure 111 comprises an open face 131, a closed face 132, a plurality of lateral faces 133, an anterior pocket 134, and an aft netting 135.

The open face 131 forms the open boundary of the semi-enclosed prism structure of the pan structure 111. The open face 131 is a horizontally oriented structure. The open face 131 forms the superior boundary of the prism structure of the pan structure 111.

The closed face 132 forms the closed boundary of the semi-enclosed prism structure of the pan structure 111 that is distal from the open face 131. The closed face 132 is a horizontally oriented structure. The closed face 132 forms the inferior surface of the prism structure of the pan structure 111. The closed face 132 forms a supporting platform that elevates the load contained within the pan structure 111 above the supporting surface 105.

The plurality of lateral faces 133 forms the vertical containment surfaces of the container formed by the pan structure 111. Each of the plurality of lateral faces 133 is a vertically oriented structure that spans from the closed face 132 to the open face 131. The plurality of lateral faces 133 comprises an anterior lateral face 161, a port lateral face 162, a starboard lateral face 163, and a posterior lateral face 164.

The anterior lateral face 161 is the lateral face selected from the plurality of lateral faces 133 that forms the forward side vertical containment for the pan structure 111. The anterior lateral face 161 is a solid disk-shaped structure. The anterior lateral face 161 is permanently attached to the closed face 132 of the pan structure 111.

The port lateral face 162 is the lateral face selected from the plurality of lateral faces 133 that forms the port side vertical containment for the pan structure 111. The port lateral face 162 forms a solid surface as the boundary of pan structure 111. The port lateral face 162 further comprises a port frame 171 and a port panel 172.

The port frame 171 is a solid mechanical structure. The port frame 171 attaches permanently to the port side of the closed face 132 of the pan structure 111. The port frame 171 encloses the port side of the pan structure. The port frame 171 is a plate structure.

The port panel 172 is a solid disk-shaped plate structure. The port panel 172 is an interchangeable structure that attaches to the exterior surface of the port frame 171. The port panel 172 displays an image. The image is formed from indicia which convey a sentiment. By interchangeable structure is further meant that a first port panel 172 can be exchanged with a second port panel 172. The port frame 171 comprises a port sub-plurality of anchor points selected from a plurality of anchor points 195 that allow bungee cords to anchor the port panel 172 to the interior structure formed by the port frame 171.

The starboard lateral face 163 is the lateral face selected from the plurality of lateral faces 133 that forms the starboard side vertical containment for the pan structure 111. The starboard lateral face 163 forms a solid surface as the boundary of pan structure 111. The starboard lateral face 163 further comprises a starboard frame 181 and a starboard panel 182.

The starboard frame 181 is a solid mechanical structure. The starboard frame 181 attaches permanently to the starboard side of the closed face 132 of the pan structure 111. The starboard frame 181 encloses the starboard side of the pan structure. The starboard frame 181 is a plate structure.

The starboard panel 182 is a solid disk-shaped plate structure. The starboard panel 182 is an interchangeable structure that attaches to the exterior surface of the starboard frame 181. The starboard panel 182 displays an image. The image is formed from indicia which convey a sentiment. By interchangeable structure is further meant that a first starboard panel 182 can be exchanged with a second starboard panel 182. The starboard frame 181 comprises a starboard sub-plurality of anchor points selected from a plurality of anchor points 195 that allow bungee cords to anchor the starboard panel 182 to the interior structure formed by the starboard frame 181.

The posterior lateral face 164 is the lateral face selected from the plurality of lateral faces 133 that forms the aft side vertical containment for the pan structure 111. The posterior lateral face 164 is an openwork structure that is enclosed using an aft netting 135.

The anterior pocket 134 is a secured containment space that permanently attaches to the posterior surface of the anterior lateral face 161 of the plurality of lateral faces 133 of the pan structure 111. By secured containment space is meant that the anterior pocket 134 locks for the purpose of preventing unauthorized access to the contents of the anterior pocket 134. The anterior pocket 134 comprises a pouch 191, a fastening device 192, and a lock 193.

The pouch 191 is a flexible storage structure that attaches to the posterior surface of the anterior lateral face 161 of the pan structure 111. The pouch 191 forms a containment space used for storing objects of value. The fastening device 192 is a fastener. The fastener is defined elsewhere in this disclosure. The fastening device 192 fastens the pouch 191 into a closed position such that the interior space of the pouch 191 is not accessible from the exterior of the pouch 191. The fastening device 192 unfastens the pouch 191 into an open position such that the interior space of the pouch 191 is accessible from the exterior of the pouch 191. The lock 193 is a mechanical structure that secures the pouch 191 in the closed position. The lock 193 is roughly positioned at center of the pouch 191.

The aft netting 135 is a textile structure. The aft netting 135 has a mesh structure. The aft netting 135 forms an openwork structure. The aft netting 135 attaches to the open posterior lateral face 164 of the pan structure 111 such that objects will not slide out of the pan structure 111 during transport. The aft netting 135 encloses the posterior lateral face 164 by simultaneously attaching to the port frame 171 of the port lateral face 162 and the starboard frame 181 of the starboard lateral face 163.

The cooler 104 inserts into the cooler 104 pan 112 of the master cart 101. The cooler 104 pan 112 is a prism structure. The cooler 104 pan 112 has a pan shape. The cooler 104 pan 112 forms a load bearing platform. The cooler 104 pan 112 is geometrically similar to the cooler 104 such that the cooler 104 inserts into the cooler 104 pan 112 for storage and transport. The prism structure of the cooler 104 pan 112 attaches to the prism structure of the pan structure 111 to form a lateral prism structure. The cooler 104 pan 112 attaches to the anterior surface of the anterior lateral face 161 of the pan structure 111. The cooler 104 and pan 112 forms vertically oriented barriers that prevent the cooler 104 from shifting during transport.

The plurality of wheels 113 forms a chassis on which the pan structure 111 and the cooler 104 pan 112 attach. The plurality of wheels 113 elevates the pan structure 111 and the cooler 104 pan 112 above the supporting surface 105. The plurality of wheels 113 roll the invention 100 over the supporting surface 105.

The umbrella 122 structure 102 is a mechanical structure. The umbrella 122 structure 102 attaches an umbrella 122 to the master cart 101. The umbrella 122 structure 102 is a telescopic structure. The umbrella 122 structure 102 is an adjustable structure. By adjustable is meant that the umbrella 122 structure 102 adjusts the position of the umbrella 122 relative to the master cart 101. The umbrella 122 structure 102 comprises a telescopic mount 121, an umbrella 122, and a mounting ring 123.

The umbrella 122 is a mechanical structure used to provide protection from the weather. The umbrella 122 attaches to the end of the telescopic mount 121 that is distal from the pan structure 111 of the master cart 101. This disclosure assumes that the umbrella 122 is externally provisioned. The umbrella 122 is defined elsewhere in this disclosure.

The telescopic mount 121 is a horizontally oriented mechanical structure. The telescopic mount 121 has a composite prism shape. The telescopic mount 121 attaches to the master cart 101 in the manner of a cantilever. The telescopic mount 121 attaches the umbrella 122 to the master cart 101. The span of the length of the composite prism structure of the telescopic mount 121 adjusts such that the reach between the umbrella 122 and the master cart 101 is adjustable. The telescopic mount 121 rigidly attaches to the inferior surface of the closed face 132 of the pan structure 111.

The telescopic mount 121 is a telescopic structure that comprises a first arm 141, a second arm 142, and a first detent 151. The first detent 151 is a mechanical device that locks and secures the first arm 141 to the second arm 142. The first arm 141 is a hollow prism that is further defined with an inner dimension. The second arm 142 is a hollow prism that is further defined with an outer dimension. The second arm 142 is geometrically similar to the first arm 141. The span of the outer dimension of the second arm 142 is lesser than the span of the inner dimension of the first arm 141 such that the second arm 142 inserts into the first arm 141 in a telescopic fashion to form a composite prism structure.

The span of the length of the telescopic mount 121 adjusts by adjusting the relative position of the second arm 142 within the first arm 141. The position of the second arm 142 relative to the first arm 141 is held in position using the first detent 151. The first detent 151 is selected from the group consisting of a cotter pin, a G snap collar, a cam lock collar, a threaded clutch, a split collar lock, and a spring loaded ball lock.

The telescopic mount 121 is a telescopic structure that further comprises a third arm 143, and a second detent 152. The second detent 152 is a mechanical device that locks and secures the third arm 143 to the second arm 142. The second arm 142 is a hollow prism that is further defined with an inner dimension. The third arm 143 is a hollow prism that is further defined with an outer dimension. The third arm 143 is geometrically similar to the second arm 142. The span of the outer dimension of the third arm 143 is lesser than the span of the inner dimension of the second arm 142 such that the third arm 143 inserts into the second arm 142 in a telescopic fashion to form a composite prism structure.

The span of the length of the telescopic mount 121 adjusts by adjusting the relative position of the third arm 143 within the second arm 142. The position of the third arm 143 relative to the second arm 142 is held in position using the second detent 152. The second detent 152 is selected from the group consisting of a cotter pin, a G snap collar, a cam lock collar, a threaded clutch, a split collar lock, and a spring loaded ball lock.

The mounting ring 123 secures the umbrella 122 to the telescopic mount 121. The mounting ring 123 is a disk-shaped structure. The mounting ring 123 has a ring shape. The inner diameter of the ring shape of the mounting ring 123 is greater than the outer diameter of the central rod that supports the umbrella 122. The umbrella 122 inserts into the mounting ring 123 during mounting. The mounting ring 123 attaches to the end of the third arm 143 that is distal from the second arm 142. The mounting ring 123 further comprises a securing structure 124 that secures the umbrella 122 to the mounting ring 123.

The securing structure 124 is a mechanical structure that comprises one or more bolts and one or more nuts. The one or more nuts are formed in the lateral face of the ring structure of the securing structure 124 of the mounting ring 123. Each bolt selected from the one or more bolts of the securing structure 124 is sized such that the selected bolt screws through a nut selected from the plurality of nuts such that the selected bolt presses against the central rod of the umbrella 122. The combined pressure of each of the one or more bolts of the securing structure 124 against the central rod secures the central rod of the umbrella 122 into a fixed position within the mounting ring 123.

The handle 103 is a grip used to manipulate the invention 100. The handle 103 attaches to the bow of the master cart 101. The handle 103 allows the master cart 101 to be pulled in its primary sense of direction 106. In the first potential embodiment of the disclosure, the handle 103 is a cord.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Anterior: As used in this disclosure, anterior is a term that is used to refer to the front side or direction of a structure. When comparing two objects, the anterior object is the object that is closer to the front of the structure.

Aperture: As used in this disclosure, an aperture is a prism-shaped negative space that is formed completely through a structure or the surface of a hollow structure.

Axle: As used in this disclosure, an axle is a cylindrical shaft that is inserted through the center of one or more wheels such that the axis of rotation of the one or more wheels and the center axis of the axle are aligned.

Bolt: As used in this disclosure, a bolt is a cylindrical shaft that is formed with an exterior screw thread. A bolt is defined with an outer diameter.

Bow: As used in this disclosure, the bow refers to the anterior side of an object, vehicle, or vessel. Specifically, the bow refers to the most forward element of the object in the direction of the primary sense of direction of the object vehicle, or vessel.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cart: As used in this disclosure, a cart is a small vehicle intended to be moved by a person. A synonym for cart is hand cart.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chassis: As used in this disclosure, a chassis is a wheeled structure that is used to transport an attached load.

Closed Position: As used in this disclosure, a closed position refers to a moving structure that is in an orientation that prevents the insertion of a first object into a second object. The closed position is often referred to as an object being "closed." Always use orientation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners.

Foodstuff: As used in this disclosure, a foodstuff refers to an edible material that is used as food or a beverage.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition. See Label.

Indicia: As used in this disclosure, the term indicia refers to a set of markings that identify a sentiment. See sentiment.

Inferior: As used in this disclosure, the term inferior refers to a directional reference that is parallel to and in the same direction as the force of gravity when an object is positioned or used normally.

Inner Diameter: As used in this disclosure, the term inner diameter is used in the same way that a plumber would refer to the inner diameter of a pipe.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Interchangeable: As used in this disclosure, interchangeable refers to the ability to remove and replace an element of a structure. For example, if a first object that is attached to a structure can be removed and replaced with a second object selected from a plurality of compatible objects than the first object is said to be replaceable with both: 1) the second object; and, 2) each of the elements of compatible objects. Term interchangeable is commonly associated with tools. Interchangeable objects are often used to change the function or the performance characteristics of a tool.

Interior: As used in this disclosure, the interior is used as a relational term that implies that an object is contained within the boundary of a structure or a space.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a device that prevents the unauthorized entry into a container or chamber.

Mesh: As used in this disclosure, the term mesh refers to an openwork fabric made from threads, yarns, cords, wires, or lines that are woven, knotted, or otherwise twisted or intertwined at regular intervals. Synonyms for mesh include net. A mesh structure formed from metal bars or wires is often referred to as a grate.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a moving structure that is in an orientation that presents that allows the insertion of a first object into a second object. The open position is often referred to as an object being "open."

Orientation: As used in this disclosure, orientation refers to the positioning of a first object relative to: 1) a second object; or, 2) a fixed position, location, or direction.

Outer Diameter: As used in this disclosure, the term outer diameter is used in the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. When made of wood, a plate is often referred to as a board or a plank.

Platform: As used in this disclosure, a platform is a raised horizontal surface that forms a load path to support objects placed on the superior surface of the platform.

Pocket: As used in this disclosure, a pocket is a storage space that is formed on or into an object.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Ring: As used in this disclosure, a ring is term that is used to describe a disk-like structure through which an aperture is formed. Rings are often considered loops.

Roll: As used in this disclosure, the term roll refers to the motion of an object that is facilitated by the rotation of one or more wheels or a casters.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Sentiment: As used in this disclosure, a sentiment refers to a symbolic meaning or message that is communicated through the use of an image, potentially including a text based image. See image and optical character recognition.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Textile: As used in this disclosure, a textile is a material that is woven, knitted, braided or felted. Synonyms in common usage for this definition include fabric and cloth. The two surfaces of the textile with the greatest surface area are called the faces of the textile.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

U-Shaped Structure: As used in this disclosure, a U-shaped structure refers to a three-sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm. The first arm and the second arm project away from the crossbeam in the manner of a cantilever.

Umbrella: As used in this disclosure, an umbrella is a device used for protection against the weather comprising a (typically circular) canopy made of a textile or sheeting that is mounted on a folding metal frame that is supported by a central rod.

Vehicle: As used in this disclosure, a vehicle is a device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A beach cart comprising
a master cart, an umbrella structure, and a handle;
wherein the beach cart is a hand propelled vehicle;
wherein the umbrella structure attaches to the master cart;
wherein the handle attaches to the master cart;
wherein the handle manipulates and propels the beach cart;
wherein the master cart forms a containment structure that contains a load during transport on the beach cart;
wherein a cooler is inserted onto the master cart;
wherein the umbrella structure allows the umbrella to be used while attached to the master cart;
wherein the master cart comprises a pan structure, a cooler pan, and a plurality of wheels;
wherein the pan structure comprises an open face, a closed face, a plurality of lateral faces, an anterior pocket, and an aft netting;
wherein the open face forms the open boundary of the semi-enclosed prism structure of the pan structure;
wherein the open face is a horizontally oriented structure;
wherein the open face forms the superior boundary of the prism structure of the pan structure;
wherein the closed face forms the closed boundary of the semi-enclosed prism structure of the pan structure that is distal from the open face;
wherein the closed face is a horizontally oriented structure;
wherein the closed face forms the inferior surface of the prism structure of the pan structure;
wherein the closed face forms a supporting platform that elevates the load contained within the pan structure above the supporting surface;
wherein the plurality of lateral faces forms the vertical containment surfaces of the container formed by the pan structure;
wherein each of the plurality of lateral faces is a vertically oriented structure that spans from the closed face to the open face;
wherein the anterior pocket is a secured containment space that permanently attaches to the posterior surface of the anterior lateral face of the plurality of lateral faces of the pan structure;
wherein by secured containment space is meant that the anterior pocket locks for the purpose of preventing unauthorized access to the contents of the anterior pocket;
wherein the aft netting forms an openwork structure.

2. The beach cart according to claim 1
wherein the cooler is a prism-shaped structure;
wherein the master cart forms the primary vehicle structure of the beach cart;
wherein the master cart is a hand propelled structure;
wherein the master cart is a rolling structure;
wherein the master cart rolls over a supporting surface;
wherein the master cart is a load bearing structure.

3. The beach cart according to claim 2
wherein the umbrella structure is a mechanical structure;
wherein the umbrella structure attaches an umbrella to the master cart;
wherein the umbrella structure is a telescopic structure;
wherein the umbrella structure is an adjustable structure;
wherein by adjustable is meant that the umbrella structure adjusts the position of the umbrella relative to the master cart.

4. The beach cart according to claim 3
wherein the handle is a grip used to manipulate the beach cart;
wherein the handle attaches to the bow of the master cart;
wherein the handle allows the master cart to be pulled.

5. The beach cart according to claim 4
wherein the cooler pan attaches to the pan structure to form a lateral prism structure;
wherein the cooler inserts into the cooler pan of the master cart;
wherein the plurality of wheels forms a chassis on which the pan structure and the cooler pan attach;
wherein the plurality of wheels elevates the pan structure and the cooler pan above the supporting surface;
wherein the plurality of wheels roll the beach cart over the supporting surface.

6. The beach cart according to claim 5
wherein the umbrella structure comprises a telescopic mount, the umbrella, and a mounting ring;
wherein the mounting ring secures the umbrella to the telescopic mount;
wherein the telescopic mount attaches the umbrella to the master cart;
wherein the telescopic mount has a composite prism shape;
wherein the span of the length of the composite prism structure of the telescopic mount adjusts such that the reach between the umbrella and the master cart is adjustable.

7. The beach cart according to claim 6
wherein the pan structure is a containment structure;
wherein the pan structure is a prism-shaped structure;
wherein the pan structure has a semi-enclosed prism structure;
wherein the pan structure forms a load bearing platform;
wherein the pan structure contains a load during transport;

wherein the load contained by the pan structure is the load carried by the master cart with the exception of the cooler.

8. The beach cart according to claim 7
wherein the plurality of lateral faces comprises an anterior lateral face, a port lateral face, a starboard lateral face, and a posterior lateral face;
wherein the anterior lateral face is the lateral face selected from the plurality of lateral faces that forms the forward side vertical containment for the pan structure;
wherein the anterior lateral face is a solid disk-shaped structure;
wherein the anterior lateral face is permanently attached to the closed face of the pan structure;
wherein the port lateral face is the lateral face selected from the plurality of lateral faces that forms the port side vertical containment for the pan structure;
wherein the starboard lateral face is the lateral face selected from the plurality of lateral faces that forms the starboard side vertical containment for the pan structure;
wherein the posterior lateral face is the lateral face selected from the plurality of lateral faces that forms the aft side vertical containment for the pan structure.

9. The beach cart according to claim 8 wherein the posterior lateral face is an openwork structure that is enclosed using the aft netting.

10. The beach cart according to claim 9
wherein the port lateral face is an interchangeable structure;
wherein by interchangeable structure is meant that the configuration of the port lateral face is selected from the group consisting of: a) the port lateral face forming an open boundary of the pan structure; and, b) the port lateral face forming a solid surface as the boundary of pan structure;
wherein by interchangeable structure is further meant that a first solid surface used to form the boundary of the port lateral face of the pan structure can be exchanged with a second solid surface;
wherein the starboard lateral face is an interchangeable structure;
wherein by interchangeable structure is meant that the configuration of the starboard lateral face is selected from the group consisting of: a) the starboard lateral face forming an open boundary of the pan structure; and, b) the starboard lateral face forming a solid surface as the boundary of pan structure;
wherein by interchangeable structure is further meant that a third solid surface used to form the boundary of the starboard lateral face of the pan structure can be exchanged with a fourth solid surface.

11. The beach cart according to claim 10
wherein the anterior pocket comprises a pouch, a fastening device, and a lock;
wherein the pouch is a flexible storage structure that attaches to the posterior surface of the anterior lateral face of the pan structure;
wherein the pouch forms a containment space used for storing objects of value;
wherein the fastening device is a fastening device;
wherein the fastening device is defined elsewhere in this disclosure;
wherein the fastening device fastens the pouch into a closed position such that the interior space of the pouch is not accessible from the exterior of the pouch;
wherein the fastening device unfastens the pouch into an open position such that the interior space of the pouch is accessible from the exterior of the pouch;
wherein the lock is a mechanical structure that secures the pouch in the closed position.

12. The beach cart according to claim 11
wherein the aft netting is a textile structure;
wherein the aft netting has a mesh structure;
wherein the aft netting encloses the posterior lateral face by simultaneously attaching to the port lateral face and the starboard lateral face.

13. The beach cart according to claim 12
wherein the cooler pan is a prism structure;
wherein the cooler pan has a pan shape;
wherein the cooler pan forms a load bearing platform;
wherein the cooler pan is geometrically similar to the cooler such that the cooler inserts into the cooler pan for storage and transport;
wherein the prism structure of the cooler pan attaches to the prism structure of the pan structure to form a lateral prism structure;
wherein the cooler pan attaches to the anterior surface of the anterior lateral face of the pan structure.

14. The beach cart according to claim 13
wherein the telescopic mount attaches to the master cart in the manner of a cantilever;
wherein the telescopic mount rigidly attaches to the inferior surface of the closed face of the pan structure;
wherein the telescopic mount is a telescopic structure that comprises a first arm, a second arm, and a first detent;
wherein the first detent is a mechanical device that locks and secures the first arm to the second arm;
wherein the first arm is a hollow prism that is further defined with an inner dimension;
wherein the second arm is a hollow prism that is further defined with an outer dimension;
wherein the second arm is geometrically similar to the first arm;
wherein the span of the outer dimension of the second arm is lesser than the span of the inner dimension of the first arm such that the second arm inserts into the first arm in a telescopic fashion to form a composite prism structure;
wherein the span of the length of the telescopic mount adjusts by adjusting the relative position of the second arm within the first arm;
wherein the position of the second arm relative to the first arm is held in position using the first detent.

15. The beach cart according to claim 14
wherein the telescopic mount further comprises a third arm, and a second detent;
wherein the second detent is a mechanical device that locks and secures the third arm to the second arm;
wherein the second arm is a hollow prism that is further defined with an inner dimension;
wherein the third arm is a hollow prism that is further defined with an outer dimension;
wherein the third arm is geometrically similar to the second arm;
wherein the span of the outer dimension of the third arm is lesser than the span of the inner dimension of the second arm such that the third arm inserts into the second arm in a telescopic fashion to form a composite prism structure;
wherein the span of the length of the telescopic mount adjusts by adjusting the relative position of the third arm within the second arm;

wherein the position of the third arm relative to the second arm is held in position using the second detent.

16. The beach cart according to claim 15
wherein the mounting ring is a disk-shaped structure;
wherein the mounting ring has a ring shape;
wherein the inner diameter of the ring shape of the mounting ring is greater than the outer diameter of the central rod that supports the umbrella;
wherein the umbrella inserts into the mounting ring during mounting;
wherein the mounting ring attaches to the end of the third arm that is distal from the second arm.

17. The beach cart according to claim 16
wherein the port lateral face further comprises a port frame and a port panel;
wherein the port frame is a mechanical structure;
wherein the port frame attaches permanently to the port side of the closed face of the pan structure;
wherein the port frame is a solid structure;
wherein the port panel is a disk-shaped plate structure.

18. The beach cart according to claim 17
wherein the starboard lateral face further comprises a starboard frame and a starboard panel;
wherein the starboard frame is a mechanical structure;
wherein the starboard frame attaches permanently to the starboard side of the closed face of the pan structure;
wherein the starboard frame is a solid structure;
wherein the starboard panel is a disk-shaped plate structure.

19. The beach cart according to claim 18 wherein the aft netting encloses the posterior lateral face by simultaneously attaching to the port frame of the port lateral face and the starboard frame of the starboard lateral face.

* * * * *